(12) United States Patent
Bennett

(10) Patent No.: US 6,769,780 B2
(45) Date of Patent: Aug. 3, 2004

(54) KALEIDOSCOPE

(76) Inventor: Carolyn Bennett, 531 Dover Cir., Glasboro, NJ (US) 08023

(*) Notice: Subject to any disclaimer, the term of this patent is extended or adjusted under 35 U.S.C. 154(b) by 0 days.

(21) Appl. No.: 10/154,439

(22) Filed: May 20, 2002

(65) Prior Publication Data
US 2003/0214722 A1 Nov. 20, 2003

(51) Int. Cl.$^7$ .................. G02B 27/08; G03B 21/00; F21V 14/00
(52) U.S. Cl. .................. 359/616; 353/1; 362/255
(58) Field of Search ................ 359/616–617; 353/1–2; 362/255, 282; 446/16, 18, 21

(56) References Cited

U.S. PATENT DOCUMENTS

| | | | | |
|---|---|---|---|---|
| 2,452,363 A | * | 10/1948 | Flotron | 359/616 |
| 2,454,577 A | * | 11/1948 | Smith | 359/616 |
| 3,020,796 A | * | 2/1962 | Kaplan | 359/616 |
| 3,030,856 A | * | 4/1962 | Jordan | 353/1 |
| 3,066,571 A | * | 12/1962 | Shaffer | 359/616 |
| 3,096,681 A | * | 7/1963 | Burnside III | 359/616 |
| 3,111,878 A | * | 11/1963 | Welles et al. | 359/617 |
| 3,860,324 A | * | 1/1975 | Gonzalez | 359/617 |
| 3,923,368 A | * | 12/1975 | Hassel | 359/616 |
| 4,040,716 A | * | 8/1977 | Matsubara | 359/616 |
| 4,439,002 A | * | 3/1984 | Brown | 359/616 |
| 5,132,844 A | * | 7/1992 | Sharp, Jr. | 359/617 |
| 5,894,373 A | * | 4/1999 | Wong | 359/855 |

* cited by examiner

Primary Examiner—Russell Adams
Assistant Examiner—Magda Cruz
(74) Attorney, Agent, or Firm—Robert S. Lipton, Esq.; Lipton, Weinberger & Husick

(57) ABSTRACT

The invention is a kaleidoscope that folds to a substantially flat condition. The kaleidoscope has at least two mirrored surfaces joined one to another, each pair of mirrored surfaces defining a mirrored interior angle of less than 180 degrees. The kaleidoscope may be open on the third side. The kaleidoscope may be attached to folding body members such that when the body members are folded the mirrored surfaces of the kaleidoscope are folded as well. The kaleidoscope may be provided with a wheel, an eyepiece and an eyepiece lens.

11 Claims, 6 Drawing Sheets

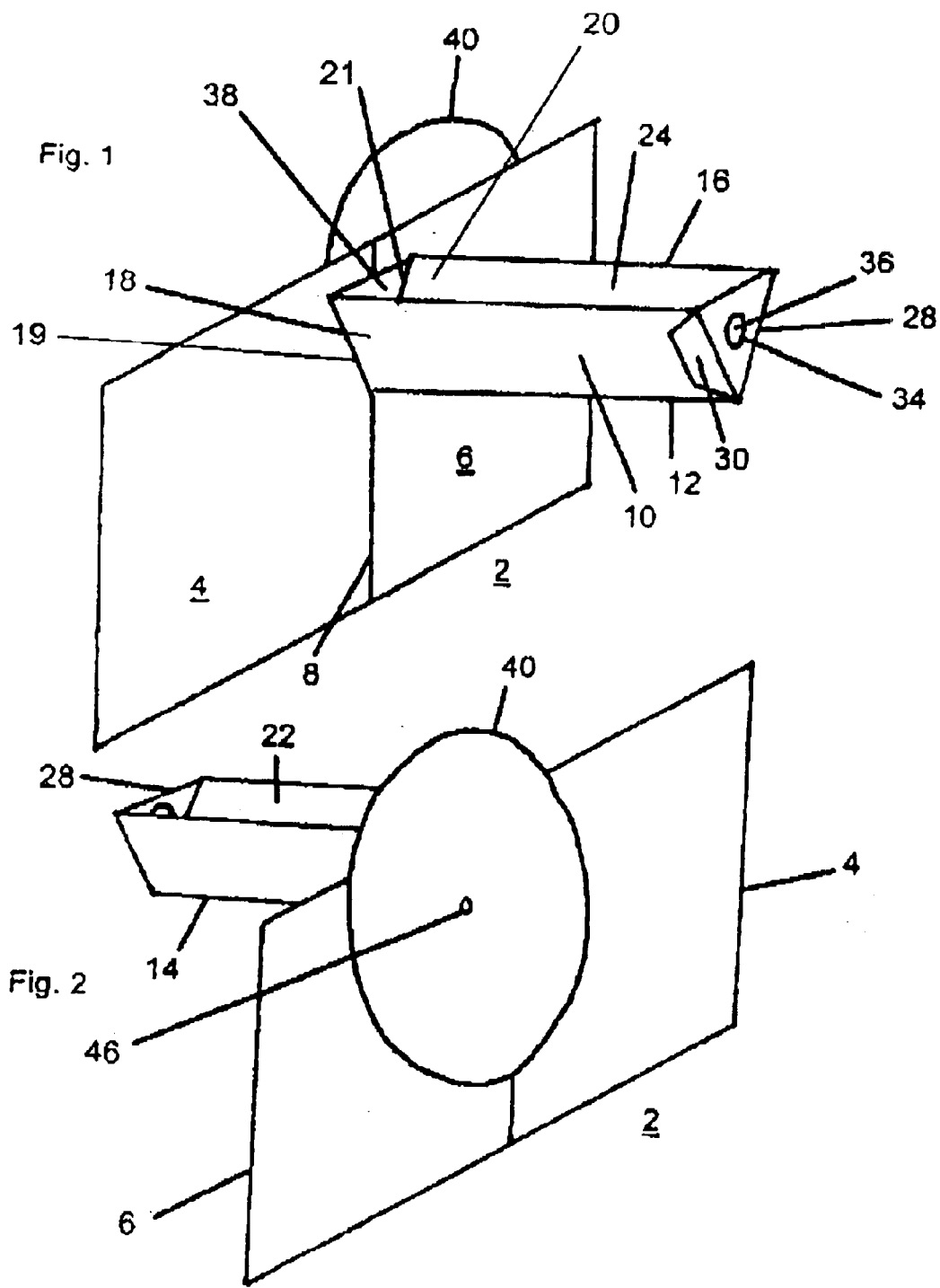

KALEIDOSCOPE

FIELD OF THE INVENTION

The invention is a kaleidoscope that folds to a substantially flat condition.

DESCRIPTION OF THE RELATED ART

The term kaleidoscope was originally coined in about 1816 by Sir David Brewster, a Scottish writer, inventor and academic. He derived the term "kaleidoscope" from the Greek words, kalos (beautiful), eidos (form) and scopos (viewer). Originally conceived as a scientific tool, the kaleidoscope gained wide popularity as an amusement and avenue for artistic expression.

The defining feature of a kaleidoscope is at least two substantially flat mirrored surfaces arrayed so that at least one straight edge of each mirrored surface intersects with one straight edge of one of the other mirrored surfaces. Each intersecting pair of mirrored surfaces therefore defines a mirrored interior angle. An object to be viewed is arrayed generally longitudinally to the line defined by the intersection of the two mirrored surfaces. A person views the object such that the person's line of sight passed within the mirrored interior angles formed by each of the intersections of the mirrored surfaces.

A portion of the light passing through or reflected by the object to be viewed is reflected one or more times from the mirrored surfaces prior to reaching the eye of the observer, creating multiple images of the object to be viewed. In its simplest configuration, a kaleidoscope has two mirrored surfaces defining a single mirrored interior angle and a third surface, the two mirrored surfaces and the third, non-mirrored surface together defining a tube. A person observing an object through the tube will see, in addition to the original object, reflected images of the original object. The reflected images, in combination with the original object, will form a pattern with multiple axes of symmetry.

Where three or more mirrored surfaces are used and where each mirrored surface intersects with two other mirrored surfaces, multiple mirrored interior angles are formed. The complexity of the pattern observed by a user may be adjusted by selecting the angle between two mirrored surfaces. The smaller the angle, the more complex the pattern observed by the user.

Kaleidoscopes may be fitted with an objective lens and a eyepiece lens to improve the optical characteristics of the device.

Kaleidoscopes are categorized largely based on the object to be viewed through the kaleidoscope. A "chamber kaleidoscope" includes a chamber adjacent to the objective end. The chamber includes means to illuminate objects enclosed within the chamber, which may comprise a window to allow light to enter the chamber or may comprise artificial light. The chamber includes means to allow observation of the objects within the chamber, such as a glass window. The chamber may be filled with a liquid to slow movement of objects within the chamber.

A "wheel kaleidoscope" provides an object mounted on an axle at the objective end of the kaleidoscope so that the object may be rotated while a viewer observes the object through the kaleidoscope. A "refillable kaleidoscope" allows a user to remove and replace the objects to be viewed from the chamber.

A kaleidoscope may be constructed without a chamber and with an eyepiece lens and an objective lens. Such a kaleidoscope functions in a manner similar to a refracting telescope, except that a portion of the light entering the objective lens is reflected one or more times on the mirrored surfaces. The user perceives multiple images forming a pattern.

None of the prior art kaleidoscopes may be folded to the substantially flat condition of the present invention. None of the prior art kaleidoscopes provide for two mirrored surfaces without the use of a third, non-mirrored surface to enclose the tube of the kaleidoscope.

SUMMARY OF THE INVENTION

The invention is a wheel kaleidoscope that folds to a substantially flat condition. The folding kaleidoscope incorporates body members that fold in a manner similar to a greeting card. The folding kaleidoscope also incorporates longitudinal members having mirrored surfaces. The unfolding of the body members moves the mirrored surfaces of the longitudinal members into proper alignment. A hinged eyepiece assembly may be affixed to the eyepiece end of the mirrored surfaces. An eyepiece lens magnifies and enhances the pattern created by reflections from the two mirrored surfaces.

A wheel assembly is provided. The user may observe the wheel assembly through the eyepiece by looking in a direction longitudinal to the intersection between the mirrored surfaces of the longitudinal members. The wheel assembly may comprise multiple wheels placed one over the other to provide a greater variety of patterns.

The wheel assembly may be translucent or transparent and light may pass through the wheel. The wheel may be opaque provided that the tube defined by the longitudinal members is not closed so that light entering the kaleidoscope from the open tube may reflect from the surface of the wheel to the user. The folding kaleidoscope may be provided with a third mirrored surface engaging the first and second mirrored surface to provide greater complexity of patterns.

In the folded condition, the kaleidoscope is relatively compact. The folding kaleidoscope may be used as a promotional item, favor, greeting card, or as simply a compact kaleidoscope.

SUMMARY OF THE FIGURES

FIG. 1 is a perspective front view of the kaleidoscope of the present invention.

FIG. 2 is a perspective rear view of the kaleidoscope.

DESCRIPTION OF AN EMBODIMENT

Figure 4:
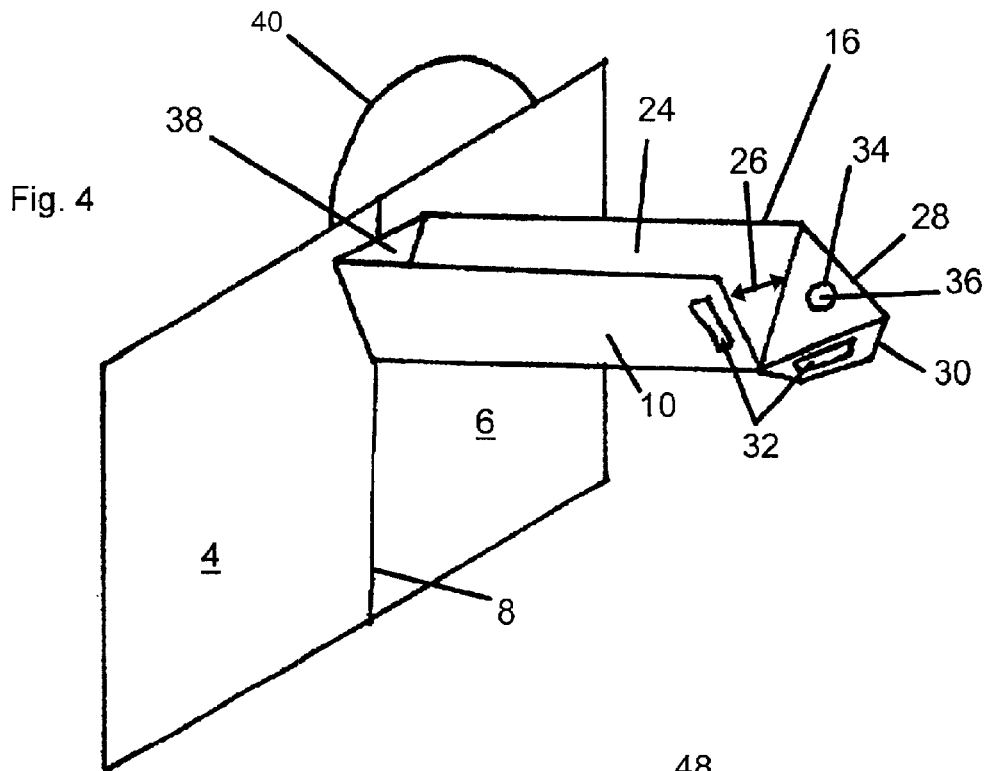
FIG. 4 is a perspective view of the kaleidoscope prepared for folding.

As shown by FIG. 1, a kaleidoscope 2 is presented. A first body member 4 is foldably attached to a second body member 6 by hinge 6. A first longitudinal member 10 has a first edge 12. First edge 12 is foldably connected to a corresponding first edge 14 (FIG. 2) of second longitudinal member 18.

First and second longitudinal members 10, 16 each has an objective end 18, 20 and a second edge 19, 21. Each second edge 19, 21 located at the objective end 18, 20 of the corresponding longitudinal member 10, 16. Each second edge 19, 21 is generally normal to the first edge 12, 14 of the corresponding longitudinal member 10, 16. Second edge 19 of first longitudinal member 10 is foldably attached to first body member 4. Second edge 21 of second longitudinal member 16 is foldably attached to second body member 6.

First longitudinal member 10 has a mirrored surface 22 (FIG. 2). Second longitudinal member 16 has a mirrored surface 24. The mirrored surfaces 22, 24 of first and second longitudinal members 10, 16 together define a mirrored interior angle 26 (FIG. 4). The mirrored interior angle 26 is less than 180 degrees. The smaller the mirrored interior angle 26, the more complex the pattern observed by the user.

An eyepiece 28 is foldably connected to second longitudinal member 16 and is releasably connected to first longitudinal member 10. The releasable connection between eyepiece 28 and first longitudinal member 10 may be by any available means. The means illustrated is a flap 30 (FIGS. 1 and 4) foldably connected to eyepiece 28 and releasably connected to first longitudinal member 10 by hook-and-loop fastener 32. Eyepiece 28 defines an aperture 34. An eyepiece lens 36 may be supported in aperture 34.

Figure 3:
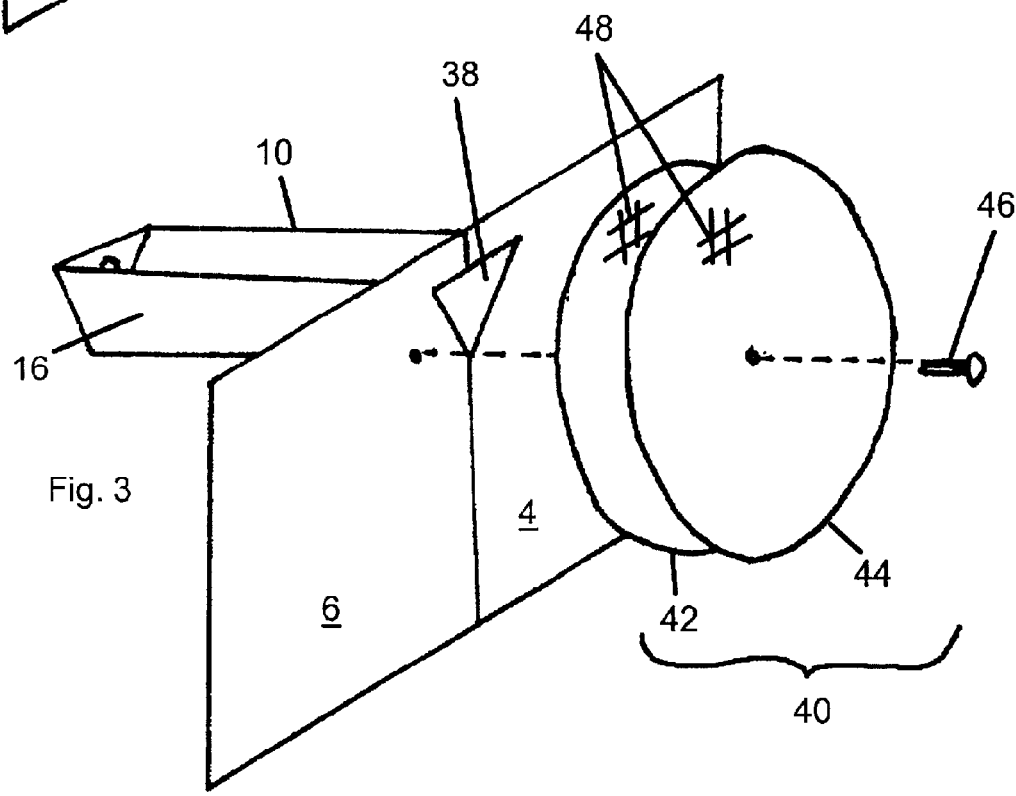
FIG. 3 is an exploded rear view of the kaleidoscope.

The first body member 4 and second body member 6 together define an objective opening 38 (FIG. 3). Light may pass through objective opening 38.

An objective wheel assembly 40 (FIG. 1) covers all or a portion of objective opening 38. Objective wheel assembly 40 comprises a first wheel 42, second wheel 44 and hub 46 (FIG. 3). Hub 46 is attached either to first body member 4 or second body member 6. First wheel 42 and second wheel 44 are translucent or transparent so that some light may pass through wheel assembly 40. Alternatively, wheel 42 or 44 may be opaque and visible to the user by reflection of light from the surface of the wheel. Indicia 48 appear on wheels 42 and 44 and are visible through objective opening 38. Wheels 42 and 44 may be rotated together or independently by a user.

In use, a user may look through eyepiece lens 32 in a direction parallel to edges 12 and 14 of longitudinal members 10 and 16. The user will see the indicia 48 displayed by the portion of the wheel assembly 40 visible through the objective opening 38. The user also will see that portion of wheel assembly 40 reflected one or more times by mirrored surfaces 22 and 24 of longitudinal members 10 and 16. The reflections of indicia 48, along with the indicia 48 visible through objective opening 38, will form patterns visible to the user. The user may view different and varying patterns of indicia 48 by rotating wheel assembly 40 or by rotating either or both of wheels 42 and 44.

Lens 36 is selected so that the portion of wheel assembly 40 visible through objective opening 38 is magnified and of enhanced appearance to the user.

Figure 5:
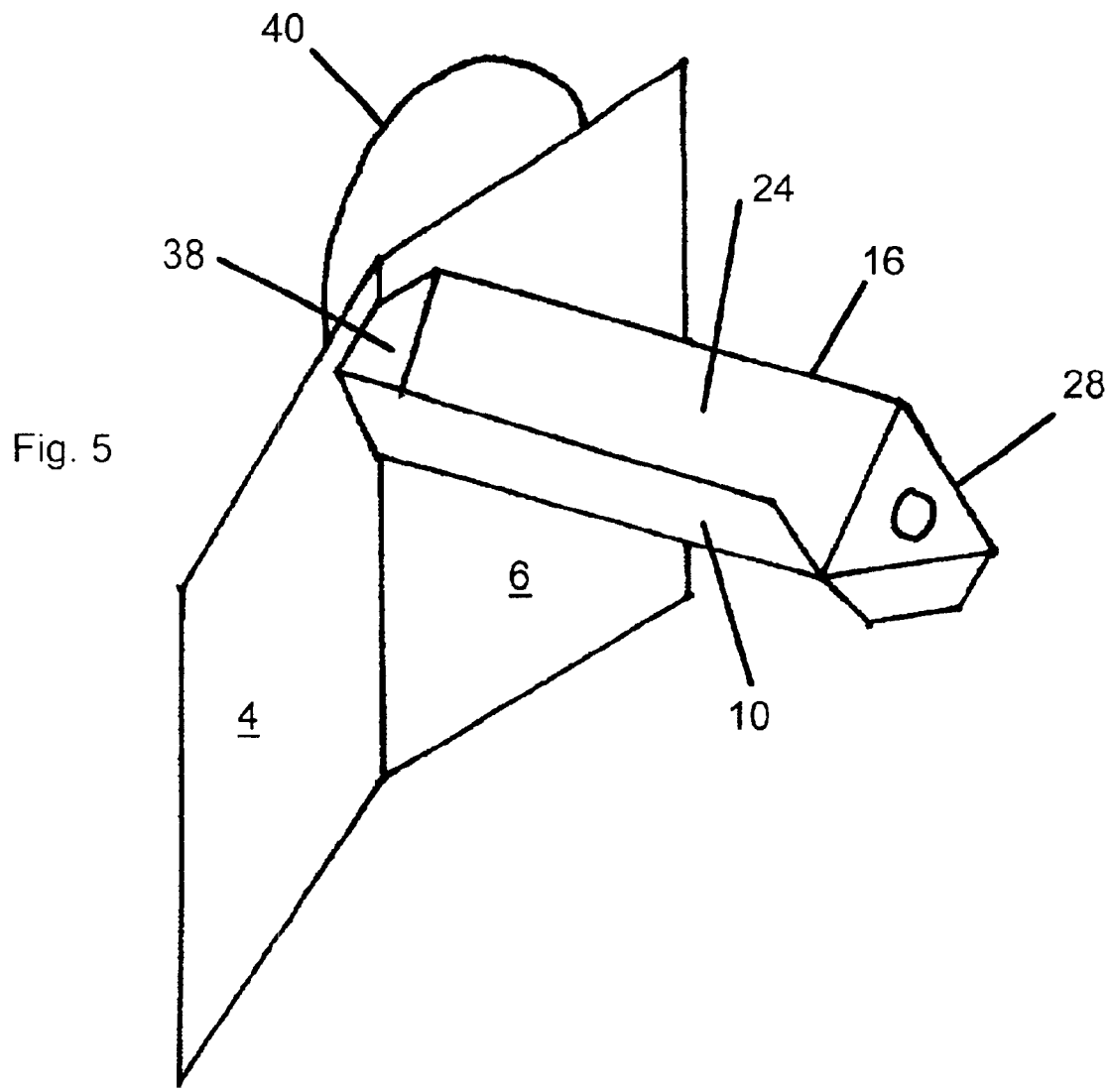
FIG. 5 is a perspective view of the kaleidoscope in a first partially folded condition.
Figure 6:
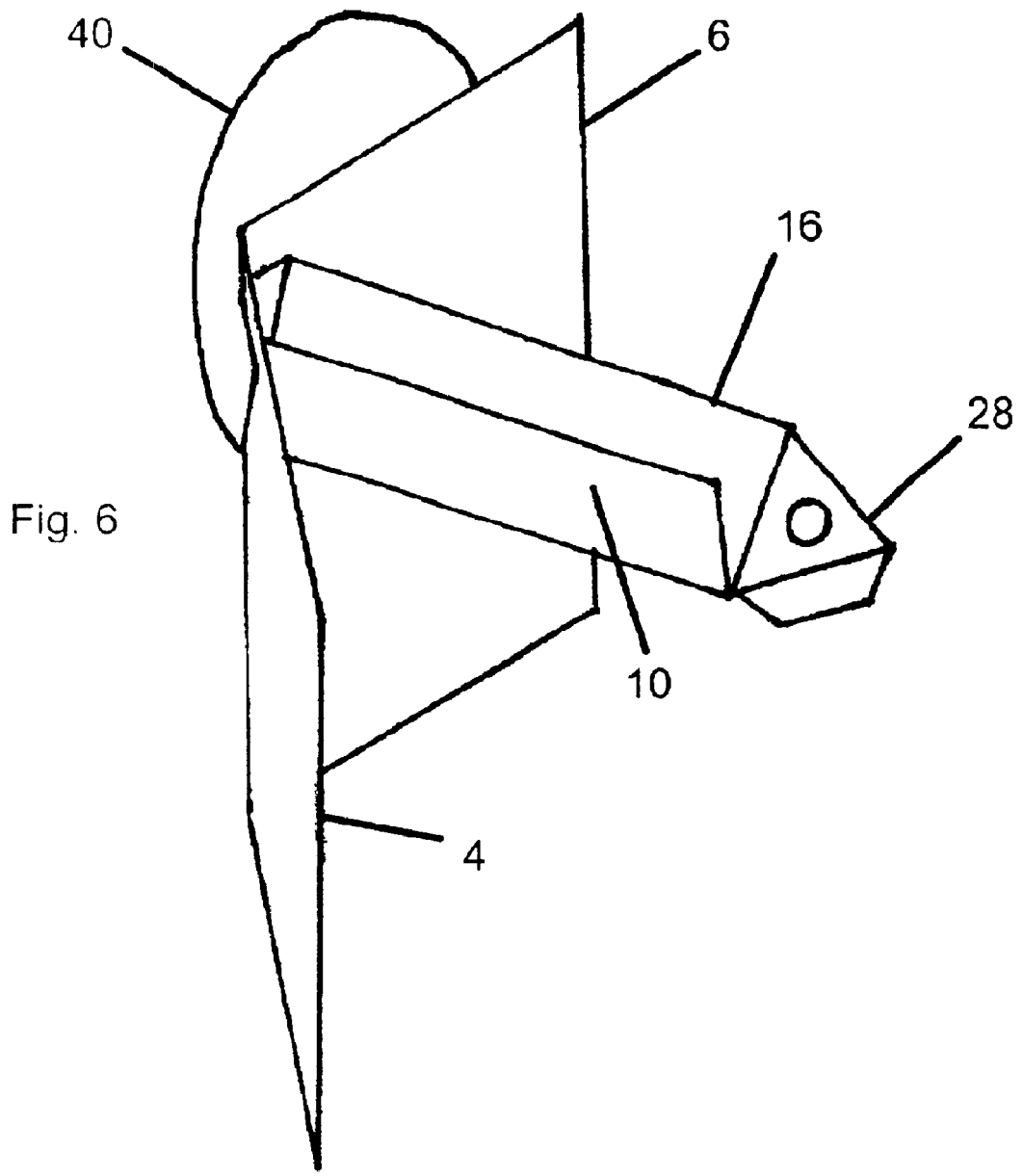
FIG. 6 is a perspective view of the kaleidoscope in a second partially folded condition.
Figure 7:
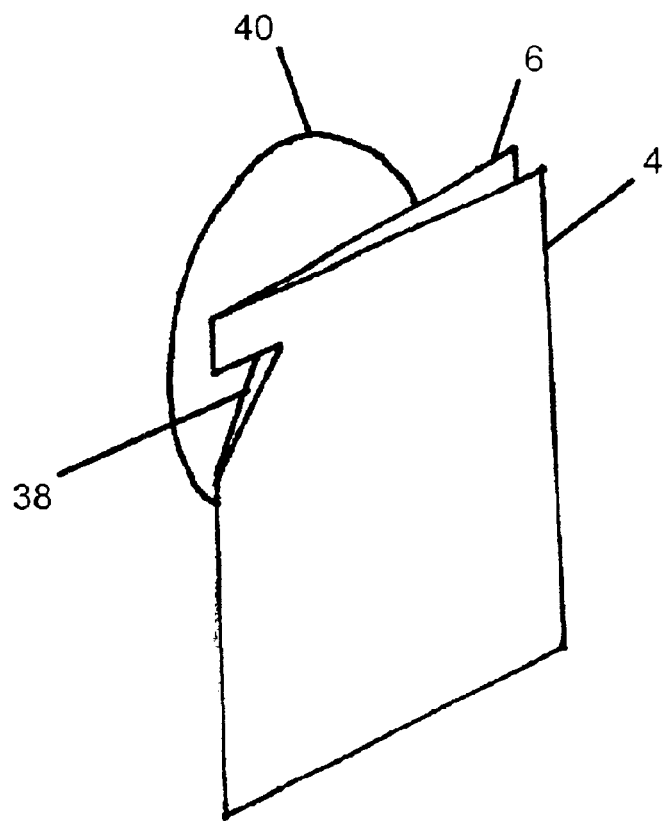
FIG. 7 is a perspective view of the kaleidoscope in a fully folded condition.

To fold the kaleidoscope 2, hook-and-loop fastener 32 is disconnected and flap 30 thereby released, disengaging eyepiece 28 from first longitudinal member 10. FIG. 4 illustrates kaleidoscope 2 with eyepiece 28 disengaged in preparation for folding of kaleidoscope 2. First body member 4 and second body member 6 then are folded about hinge 8. FIG. 5 shows the kaleidoscope in the process of being folded. FIG. 6 shows a continuation of the folding process. FIG. 7 shows the kaleidoscope 2 in a fully folded condition.

Figure 8:
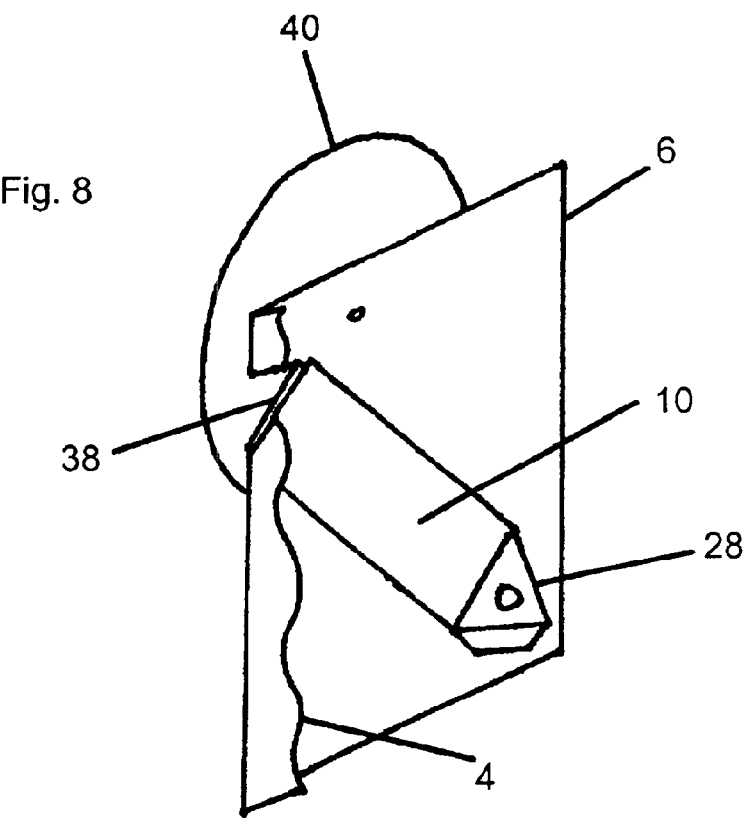
FIG. 8 is a cutaway view of the kaleidoscope in a fully folded condition.

FIG. 8 is a cutaway drawing of the kaleidoscope 2 in a fully folded condition. First body member 4 is cut away to show second body member 6, first longitudinal member 10 and eyepiece 28.

Figure 9:
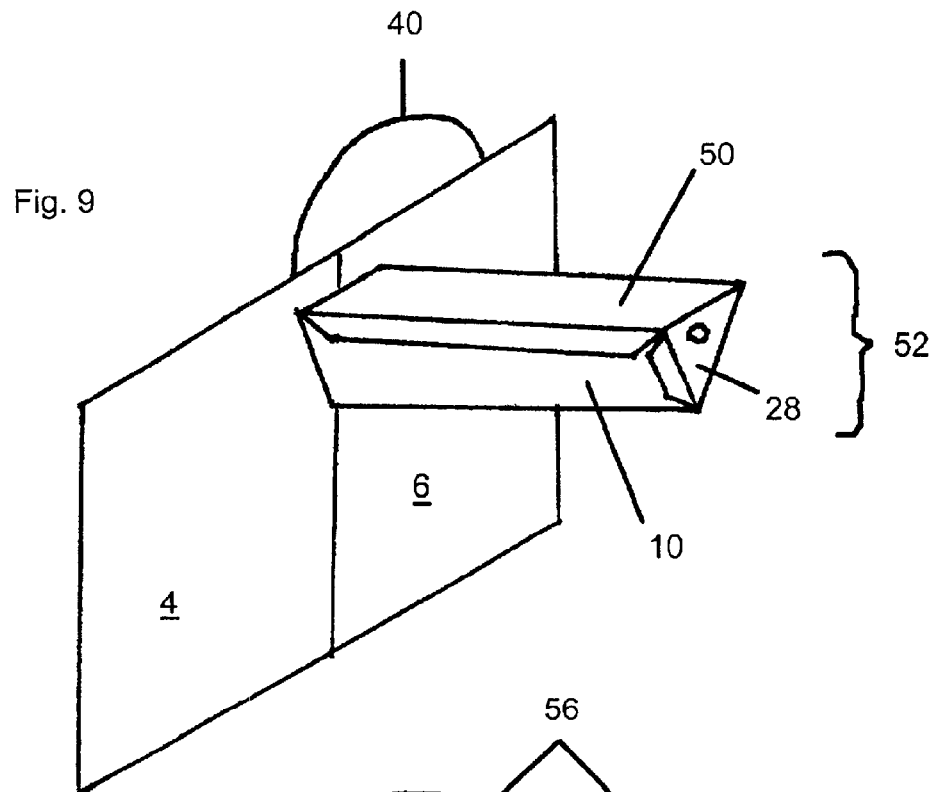
FIG. 9 is a perspective view of an alternative embodiment.
Figure 10:
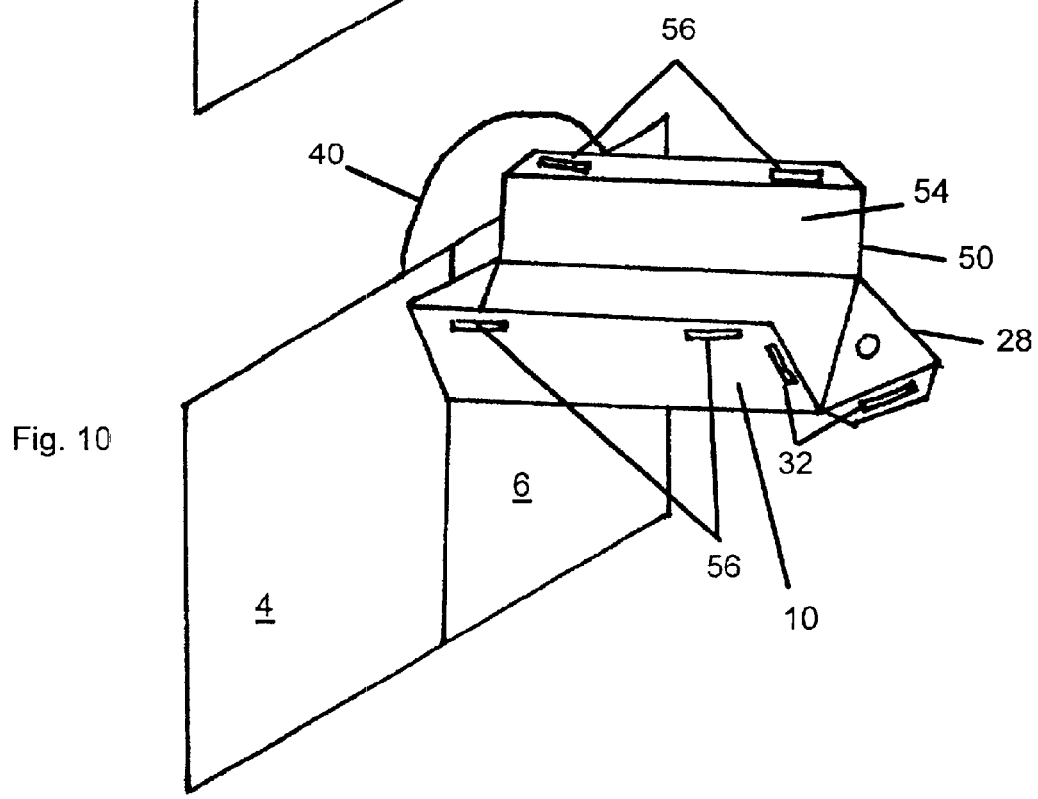
FIG. 10 is a perspective view of an alternative embodiment prepared for folding.

Kaleidoscope 2 may be equipped with a third longitudinal member 50 (FIG. 9) foldably attached to either first or second longitudinal member 10, 16 and releasably attached to the other of first or second longitudinal members 10, 16. Third longitudinal member 50 in cooperation with first and second longitudinal members 10, 16 form triangular tube 52. Third longitudinal member 50 may include a mirrored surface 54 such that the interior surfaces of triangular tube 52 are mirrored. The releasable attachment of third longitudinal member to first longitudinal member may be by any means, such as hook-and-loop fastener 56.

Many different embodiments of the above invention are possible. This application is intended to address all possible embodiments and is limited only as described in the following claims.

I claim:

1. A kaleidoscope comprising:
   a. a first longitudinal member having a mirrored surface and a first edge; and
   b. a second longitudinal member having a mirrored surface and a first edge, said first edge of said second longitudinal member end said first edge of said first longitudinal member being foldably attached one to the other, said mirrored surface of said first longitudinal member and said mirrored surface of said second longitudinal member together defining a mirrored interior angle, said mirrored interior angle being less than 180 degrees;
   c. a first body member;
   d. a second body member foldably joined to said first body, member;
   said first longitudinal member having an objective end and a second edge located at said objective end of said first longitudinal member, said second edge of said first longitudinal member being generally normal to said first edge of said first longitudinal member, said second edge of said first longitudinal member being foldably attached to said first body member;
   f. said second longitudinal member having an objective end and a second edge located at said objective end of said second longitudinal member, said second edge of said second longitudinal member being generally normal to said first edge of said second longitudinal member said second edge of said second longitudinal member being foldably attached to said second body member.

2. The kaleidoscope of claim 1 further comprising an eyepiece, said eyepiece being foldably connected to one of said first longitudinal member end said second longitudinal member; said eyepiece being releasably connected to the other of said first longitudinal member and said second longitudinal member.

3. The kaleidoscope of claim 2, further comprising an eyepiece lens mounted on said eyepiece.

4. The kaleidoscope of claim 1, said first body member and said second body member defining an objective opening.

5. The kaleidoscope of claim 4 further comprising a wheel assembly rotetably affixed to one of said first body member and said second body member such that a user may view a portion of said wheel assembly through said objective opening, said wheel assembly bearing indicia.

6. The kaleidoscope of claim 5 said wheel assembly comprising two or more wheels, said wheels bearing indicia.

7. The kaleidoscope of claim 4, said kaleidoscope further comprising a chamber attached to said first or second body member, said kaleidoscope being a chamber kaleidoscope.

8. The kaleidoscope of claim 4, said kaleidoscope having an objective lens attached to said first or second body member.

9. The kaleidoscope of claim 1, further comprising a third longitudinal member cooperating with said first longitudinal member end said second longitudinal member such that said third longitudinal member, said first longitudinal member and said second longitudinal member together defines tube.

10. The kaleidoscope of claim 9, said third longitudinal member foldably engaging one of said first longitudinal member end said second longitudinal member, said third longitudinal member releasably engaging the other of said first longitudinal member and said second longitudinal member.

11. The kaleidoscope of claim 10, said third longitudinal member having an interior surface, said interior surface of said cover member being mirrored.

* * * * *